United States Patent [19]

Morita

[11] 3,879,515

[45] Apr. 22, 1975

[54] METHOD OF MANUFACTURING POROUS ARTICLES OF SYNTHETIC RESINS

[76] Inventor: Yoshishige Morita, 413, Nayafusa-cho, Hachioji, Tokyo, Japan

[22] Filed: Oct. 18, 1973

[21] Appl. No.: 407,748

[52] U.S. Cl. ........ 264/123; 260/2.5 HB; 260/2.5 M; 260/31.2 R; 264/48; 264/126; 264/341; 264/343
[51] Int. Cl. .......................... B29g 7/02; C08f 47/08
[58] Field of Search ............ 264/126, 48, 341, 343, 264/123; 260/2.5 M, 2.5 HB, 31.2 R

[56] References Cited
UNITED STATES PATENTS

| | | | |
|---|---|---|---|
| 2,712,490 | 7/1955 | Stuchlik | 264/343 |
| 3,375,208 | 3/1968 | Duddy | 260/2.5 M |
| 3,515,567 | 6/1970 | Tani et al. | 264/343 |
| 3,642,970 | 2/1972 | Hagitani et al. | 264/126 |
| 3,674,722 | 7/1972 | Rainer et al. | 260/2.5 M |

*Primary Examiner*—Donald E. Czaja
*Assistant Examiner*—H. H. Fletcher
*Attorney, Agent, or Firm*—Blum, Moscovitz, Friedman & Kaplan

[57] ABSTRACT

A method of manufacturing porous plastic articles from a particulate high polymer, such as polystyrene or polyvinyl chloride, by separately adding at least two poor solvents or nonsolvents therefor to separate portions of the plastic particles or granules, said poor solvents or non-solvents being capable of reacting with each other, allowing said additives to permeate separately into the surface layers of the particles or granules, mixing the permeated plastics portions together, and then heating the mixture at a temperature not higher than the molding temperature to effect a chemical reaction, such as condensation or esterification between the additives at the points or areas of contact among the particles or granules and to bond them altogether with the solvent formed as the reaction product of the two poor solvents or nonsolvents.

11 Claims, No Drawings

METHOD OF MANUFACTURING POROUS ARTICLES OF SYNTHETIC RESINS

BACKGROUND OF THE INVENTION

This invention relates to a method of manufacturing porous plastics having minute spaces left among the particles from powders of high polymers such as polystyrene, polymethyl methacrylate, acrylonitrile-styrene copolymer, and polyvinyl chloride.

Generally high polymer particles take a variety of forms, from globular to irregular shapes. In order to obtain porous articles from such particles regardless of their shapes, a number of different methods have hitherto been proposed, including the following:

1. Heating the particles at a temperature not higher than their melting point with or without the application of pressure (so-called sintering process).
2. Coating of the particle surfaces or impregnation of the particles with adhesive (Japanese Patent Publication No. 6386/1957).
3. Heating of the particles with the addition of a solvent and with pressure (Japanese Patent Publication No. 2183/1961).
4. Heating of high polymer particles containing a residual monomer (Japanese Patent Publication No. 32621/1970).

To use a solvent in accordance with the method 3 above, it is only necessary to mix the particles and solvent physically or mechanically and then heat the mixture under pressure. In that case the additive which is a good solvent for the high polymer particles rapidly dissolves the particle surfaces or at least permeates into the particles, thereby swelling the particles and materially reducing the porosity of the product. In other words, the void volume of the resulting porous article is very small. For example, when powdered polystyrene and ethyl acetate are mixed or mechanically agitated together the polystyrene is converted into a gel. Naturally, heating to evaporate off excess solvent from the mixture to form a porous product is relatively expensive and therefore uneconomic. Moreover, heating of the particles in the gelled state would promote further gelation and give a nonporous product. The method 4 also tends to yield a nonporous article due to excessive gelation by heating because of the residual monomer having a high boiling point.

If a perfectly porous product is to be obtained, the following requirements which neither the method 3 nor 4 can meet must be satisfied.

1. The solvent should permeate through only limited surface layers of the particles; and
2. After the particles have been bound altogether, the solvent should be readily vaporizable.

These requirements must be fulfilled to obtain the full economic advantage.

SUMMARY OF THE INVENTION

To form a porous plastic article or mass, starting with a high polymer of the type which can be attacked by a solvent, a first portion of the selected plastic material in particulate or granular form is mixed with a nonsolvent or a poor solvent therefor, and a second portion, also in particulate or granular form, is mixed with a second poor solvent or nonsolvent where said two poor solvents or nonsolvents are adapted to react with each other to form an effective solvent for the particulate plastic. Furthermore, the poor solvents or nonsolvents are selected to form an effective solvent having a relatively high vapor pressure. After allowing said two portions of particulate plastic to stand in combination with said liquids, the two portions are mixed together under conditions such that said two liquids will react with each other. Since said plastic particles will have been permeated only to a relatively slight extent, the effective solvent which is formed will be formed essentially only at points or areas of contact between particles. Consequently, there will be no tendency for gellation of the entire mass to occur and the particles will retain essentially their original shape and the void volume of the finished mass will be essentially that originally present in the bulk powder.

For thermoplastic materials such as polyvinyl chloride, polymethyl methacrylate, polystyrene and acrylonitrile-styrene copolymer, suitable liquids are acetic acid and ethyl alcohol which can react to form ethyl acetate, an effective solvent of relatively high vapor pressure. It is advisable to add a small quantity of sulphuric acid to either the ethyl alcohol or to the orataic acid to act as a catalyst for the esterification reaction. Higher molecular weight acids and alcohols can also be used, and where such higher molecular weight compounds are solid, the temperature at which permeation is carried out may be raised sufficiently to convert them into the liquid state.

Accordingly, an object of the present invention is an improved process for forming porous plastic masses or articles from completely polymerized resins.

Another object of the present invention is an improved process for forming porous plastic articles or masses from particulate resins.

A further object of the present invention is an improved process for forming porous plastic articles or masses from resins through the use of two liquids which are themselves poor solvents or nonsolvents for said resins but which can react with each other to form an effective solvent having a relatively high vapor pressure.

Still other objects and advantages of the invention will in part be obvious and will in part be apparent from the specification.

The invention accordingly comprises the several steps and the relation of one or more of such steps with respect to each of the others thereof, which will be exemplified in the process hereinafter disclosed, and the scope of the invention will be indicated in the claims.

DESCRIPTION OF THE PREFERRED EMBODIMENTS

The present invention is predicated upon the discovery that as means to effect inter-particulate bonding of resins a chemical reaction, particularly a condensation reaction such as esterification, is useful. By way of illustration, polystyrene in powdery form of fairly uniform diameter (hereinafter called "PS") prepared by suspension polymerization is divided into two equal portions and placed into two containers. Into one container acetic acid is added and the mixture is thoroughly stirred (the resultant being hereinafter called the "mixture I"), and in the other container the charge is stirred well with ethyl alcohol containing a catalytic amount of sulfuric acid (the resultant being called the "mixture II"). The mixtures I and II are separately allowed to stand at room temperature for a period of time. Throughout this period they should be dry and sandy. Upon standing for the given time the acetic acid molecules inn the mixture I permeate through the PS surfaces and allow the particles to swell.

Like the molecules of acetic acid in the mixture I, those of alcohol in the mixture II causes some swelling of the surface layers of the PS particles, a phenomenon often observed when a high molecular substance and a solvent are brought into contact. Acetic acid and alcohol being nonsolvents or poor solvents for PS, there is no possibility of interparticulate bonding taking place in the separate mixtures I and II after standing for a limited time.

Next, excess liquid is drained from the two containers, equal portions of mixtures I and II which have been allowed to stand at room temperature are placed into a third container, mixed well by stirring, and the mixture is placed in a mold and heated to about 100°C. If PS alone is heated without pressure, it will not melt at the temperature of about 100°C.

As the mixtures I and II are uniformly heated together, esterification takes place on the PS surface in the manner well known in the art.

The esterification reaction is:

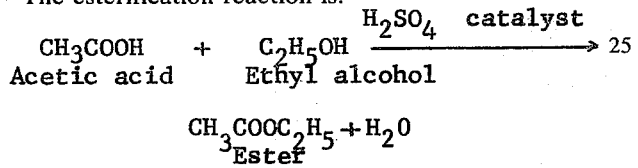

Generally esters are good solvents for highmolecular compounds such as PS.

The order of solubility of the solvents and reaction product to PS is as follows:

Ester >> acetic acid > alcohol

The most noteworthy feature of this invention is that the esterification preferentially progresses only at those points or regions of contact of the particles; the reaction does not occur at all or seldom occurs in the remainder of the particles. (This means that fusion of particles rarely occurs in the portions where any such fusion is not required for the forming of a porous product).

The ester produced in the contacting portions of the PS particles is a good solvent for the PS itself, and therefore a uniform PS-ester mixture is rapidly formed in the contacting portions of PS and the solvent acts as a fusing agent for the PS particles.

It is noted in this connection that in the field of organic chemistry the following general principles are known:

1. Generally esters have lower boiling points than their parent organic acids.
   In the example being described, the solvents and their boiling points are:

| Ethyl acetate | ($CH_3COOC_2H_5$: ester) | b.p. | 77°C |
| Acetic acid | ($CH_3COOH$) | b.p. | 118°C |
| Ethyl alcohol | ($C_2H_5OH$) | b.p. | 78.3°C |

2. An ordinary organic solvent in the present of water may form an azeotropic mixture which has a boiling point lower than that of the organic solvent alone.

In the practice of this invention, the solvents are not limited to acetic acid and ethyl alcohol but other organic acids and alcohols may be used as well. Higher (large carbon number) organic acids and alcohols are available in the form of higher boiling liquids and solids, but this does not have any adverse effect upon the esterification provided said solids melt below about 100°C and below the melting point of the resin to be fused. It is not objectionable in that such solid acid and alcohol may be dissolved by a nonsolvent or poor solvent for the high-molecular particles of PS before they are mixed altogether, or may be liquified by a relatively small increase in temperature.

The porous product obtained in the manner described usually contains residual unreacted matter, which, when heated in a large quantity of hot water, readily forms an azeotropic mixture with the water and evaporates off as such. This azeotropic mixture can be recovered with little difficulty. While the ester thus recovered may be reused for some other application, it is not difficult to hydrolyze it by the addition of an alkali thereby to recover the original acid and alcohol.

The void volumes of the porous products obtained by the procedures above described range from 35 to 50 percent.

EXAMPLE 1

Twenty grams of polyvinyl chloride powder ground to a particle size all passing a 65-mesh screen was placed in a beaker. With the addition of 4.6 g (0.1 mol) of ethyl alcohol containing one milliliter of concentrated sulfuric acid, the mixture was thoroughly stirred and then allowed to stand, with the beaker covered with plastic film. Similarly, 20 g of the polyvinyl chloride powder was charged into another beaker, stirred well with 7.4 g (0.1 mol) of acetic acid, and the mixture was allowed to stand in the same manner as above. After standing at room temperature for about 5 hours, the charges of the two beakers were collected in one container and thoroughly mixed with stirring. The mixture was introduced into a mold and heated at 100°C. In about 20 minutes the mixture gave off some alcoholic odor, and in about 30 minutes an odor of an ester. A period of about 60 minutes was enough to complete the molding. The mold was taken out into the atmosphere at room temperature, and kept intact for about 30 minutes for complete cooling and conclusion of the reaction and fusing. The porous article thus formed was taken out of the mold and dipped in a hot water bath at 60°C to wash away the ethyl ester and unreacted acetic acid and ethyl alcohol from the reaction product. Upon drying the porous product was calculated to have a void volume of 48 percent.

EXAMPLE 2

In the same manner as described in Example 1, 25 grams of powdery polymethyl methacrylate obtained by suspension polymerization in the form of 30- to 60-mesh particles was placed into a beaker and, after addition of 4.6 g of ethyl alcohol, the mixture was allowed to stand at room temperature. Another 25 g portion of the polymethyl methacrylate powder was charged into another beaker. A solution of 1.8 g of acetic acid in four times by volume of ligroin was added as divided into four portions to the particles, each time with stirring until the added portion dried up. After the total amount of the solution was added with stirring, the mixture was allowed to stand at room temperature. About half an hour later, both batches of wet powder were placed into a container, thoroughly mixed, introduced into a mold and heated to 100°C. In about 30 minutes the mixture emitted a strong odor of an ester. It was taken out, as molded, left for 15 minutes, and washed with water. After removal from the mold and drying, the product was determined to have a void volume of 45 percent.

EXAMPLE 3

The same procedure as described in Example 2 was repeated excepting that the polymethyl methacrylate was replaced by polystyrene powder prepared by suspension polymerization, and a porous product having a void volume of 43 percent was obtained.

EXAMPLE 4

To 100 g of spherical pellets (about 4 mm in diameter) of polymethyl methacrylate was added 4.6 g of ethyl alcohol in a beaker, the mixture was stirred, and, with the beaker covered, the mixture was allowed to stand at room temperature. A solution of 2 g of acetic acid in four times by volume of ligroin was divided into three portions and intermittently added to another 100 g portion of the polymethyl methacrylate. After mixing the mixture was allowed to stand at room temperature. Following 5 hours of standing, the two mixtures were thoroughly mixed together in one container, and the resultant was introduced into a mold for forming 100°C. Forty minutes later the molding thus formed was cooled down to room temperature, washed well with warm water, and dried. The product exhibited a fine illumination effect with irregular reflection of light incident thereupon. Its void volume was 38 percent.

EXAMPLE 5

The procedure of Example 4 was repeated excepting that the polymethyl methacrylate was replaced by acrylonitrilestyrene copolymer in the form of columnar pellets about 1.5 mm in diameter and about 5 mm in length. A product having an illumination effect like that of the immediately preceding example resulted. Its void volume was 36 percent.

It will thus be seen that the objects set forth above, among those made apparent from the preceding description, are efficiently attained and, since certain changes may be made in carrying out the above process without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A process of manufacturing articles of synthetic resins, comprising the steps of treating a first portion of particles of said synthetic resin with a first liquid in which said resin is substantially insoluble, treating a second portion of particles of said synthetic resin with a second liquid in which said resin is substantially insoluble, said first liquid being reactive with said second liquid to form a solvent in which said synthetic resin is soluble, allowing said portions to stand for a long enough period of time for penetration of the surface of said particles by said liquid to occur, pouring off the excess liquid from each portion at the end of said period, mixing said first treated portion with said second-treated portion, and heating said mixed portions to a temperature below the melting and the sintering temperatures of said resin to react said first liquid with said second liquid at points and regions of contact of said particles to form a solvent for said resin which bonds said particles together to form a porous article of said synthetic resin.

2. A process as defined in claim 1, which comprises the step of allowing said first and second portions of said particles to remain in contact with said first and second liquids for a period long enough to permeate the surface and immediate sub-surface layers of said particles prior to mixing together said first and second portions of particles.

3. A process as defined in claim 1, further comprising the step of heating said mixture of said first and second portions of said particles to a temperature below the melting and sintering temperatures of said resin and expelling residual liquid from said particles.

4. A process as defined in claim 3 wherein said mixture is heated in a mold to a temperature below the melting point of said resin to expel residual liquid.

5. A process as defined in claim 1, in which said reaction is esterification.

6. A process as defined in claim 1, in which said synthetic resin is polyvinyl chloride and said first and second liquids are ethyl alcohol and acetic acid, respectively.

7. A process as defined in claim 1, in which said synthetic resin is polymethyl methacrylate and said first and second liquids are ethyl alcohol and acetic acid, respectively.

8. A process as defined in claim 1, in which said synthetic resin is polystyrene and said first and second liquids are ethyl alcohol and acetic acid, respectively.

9. A process as defined in claim 1, in which said synthetic resin is a copolymer of acrylonitrile and styrene and said first and second liquids are ethyl alcohol and acetic acid, respectively.

10. A process as defined in claim 1 wherein said synthetic resin is selected from the group consisting of polyvinyl chloride, polymethyl methacrylate, polystyrene and a copolymer of acrylonitrile and styrene, said first liquid is chosen from the group of alcohols which are liquid at room temperature or at temperatures somewhat higher than room temperature but below about 100°C and said second liquid is an acid which is liquid at room temperature or at temperatures somewhat higher but below about 100°C.

11. A process as defined in claim 1 wherein at least one of said liquids is added to a portion of said plastic combination with a third nonsolvent liquid.

* * * * *